(12) United States Patent
Mao

(10) Patent No.: US 9,537,304 B2
(45) Date of Patent: Jan. 3, 2017

(54) SURGE SUPPRESSION DEVICE WITH HIGH STRUCTURAL STABILITY

(71) Applicant: Xiaomao Mao, Foshan (CN)

(72) Inventor: Xiaomao Mao, Foshan (CN)

( * ) Notice: Subject to any disclaimer, the term of this patent is extended or adjusted under 35 U.S.C. 154(b) by 108 days.

(21) Appl. No.: 14/553,988

(22) Filed: Nov. 25, 2014

(65) Prior Publication Data

US 2016/0134104 A1     May 12, 2016

(30) Foreign Application Priority Data

Nov. 10, 2014   (CN) .................. 2014 2 0665534 U

(51) Int. Cl.
*H02H 9/04*     (2006.01)

(52) U.S. Cl.
CPC .............. *H02H 9/04* (2013.01); *H02H 9/044* (2013.01)

(58) Field of Classification Search
CPC ..................................................... H02H 9/044
USPC ...................................................... 361/124
See application file for complete search history.

(56) References Cited

U.S. PATENT DOCUMENTS

| 4,288,833 | A | * | 9/1981 | Howell | H02H 9/06 337/16 |
| 6,430,019 | B1 | * | 8/2002 | Martenson | H01C 7/126 361/103 |
| RE42,319 | E | | 5/2011 | Martenson et al. | |
| 2014/0232512 | A1 | * | 8/2014 | Yang | H01H 61/02 337/401 |

\* cited by examiner

*Primary Examiner* — Scott Bauer
(74) *Attorney, Agent, or Firm* — Foley & Lardner LLP; Antoinette F. Konski

(57) ABSTRACT

A surge suppression device comprising a voltage sensitive element, heat sensitive materials, terminals, a blocking element and a non-conductive barrier is disclosed. One of the terminals comprises an arm portion, a contact portion and an extension portion extended from the contact portion. The blocking element has a part engaging with the extension portion and another part contacting with the barrier and separating the barrier from the arm portion of the terminal. The device has higher structural stability and sensitivity and is only failed in the event that the voltage sensitive element is failed due to aging or grid fault.

20 Claims, 12 Drawing Sheets

SURGE SUPPRESSION DEVICE WITH HIGH STRUCTURAL STABILITY

CROSS-REFERENCE TO RELATED DOCUMENT

The present invention claims priority benefits from Chinese utility model application number 201420665534.1, filed on Nov. 10, 2014, and titled "A surge suppression device with high structural stability", the entire disclosure of which is hereby incorporated by reference.

FIELD OF THE INVENTION

The invention disclosed relates to a surge suppression device for circuit protection and, in particular, to a surge suppressor with arc extinguishing and high structure stability.

BACKGROUND OF THE INVENTION

A surge suppression device is an electronic device used for prevent various electronic equipments, instruments, and communication circuits from damage from surge current or over-voltage caused by sudden interference external to electrical circuits.

A surge suppression device typically comprises one or more metal-oxide varistors (MOVs) connected in parallel between a service power line and a ground or neutral line, or between a neutral line and a ground line, for absorbing and dissipating the energy related to the over-voltage. MOVs are non-linear, electronic devices that are frequently subjected to various external stresses during operation, such as temperature stresses or transient voltage surge stresses.

When subject to over-voltage, i.e., voltage higher than its rating value, MOV degrades, causing increase of leakage current and in most cases overheating, and possibly thermal breakdown short circuit. The heating of MOV elevates the temperature of the surge suppression device containing the MOV. When the temperature reaches the ignition temperature of combustible materials surrounding the MOV, such as epoxy coatings or plastic housing, it may cause fire.

In order to reduce the risk of catching fire due to surge suppression devices, a thermal protector for MOV was proposed. The thermal protector of this kind is able to separate a failed MOV from a power supply circuit under certain circumstances, therefore to some extent preventing the surge suppression devices from catching fire. However, the disadvantages reside in that, if the MOV is already suffered from breakdown short circuit before the open of the connection point of the thermal protector, an electric arc will be generated between the gap as formed after the disconnection of the thermal protector. The arc current, in this situation, equals to the short-circuit current of the power supply system. An ordinary thermal protector is possibly not able to distinguish such an arc. In another aspect, even though the MOV is not suffered from breakdown short circuit before the open of the connection point of the thermal protector, an electric arc is still possibly generated due to existence of relatively high voltage and/or relatively small gap distance between the electrode of the thermal protector contacting the MOV and the electrode on the MOV surface. Therefore, the fault current originating from the power supply system may be maintained and the risk that the surge suppression device may catch fire still exists.

Therefore, some surge suppression devices are incorporated with an arc extinguishing mechanism, which overcome the disadvantage that conventional surge suppression devices having a thermal protector can only block small fault current. For example, U.S. Reissue Pat. No. RE42,319E to MERSEN France SB SAS disclosed a circuit protection device which is shown in FIG. 1 of the present invention, wherein the device comprises an arc shield 188 movable along slotted rails 138. One end of the arch shield 188 is normally contact with a compression spring 139 and the other end is contact with the arm portion 152c of the contact element 152. The arm portion 152c prevents the arc shield 188 from moving upward. When the solder material 182 starts to melt due to the overheat of the MOV 112, the arm portion 152c will separate with the MOV 112, whereby the arc shield 188 is released and moved along the rail 138 and finally stops at a position between the MOV 112 and the arm portion 152, so as to shield any electrical arc that may be generated.

However, the device of RE42,319E suffers from a disadvantage that the arc shield 188 applies a force, in a direction substantially perpendicular to the movement direction thereof, to the arm portion 152c due to the existence of the spring 139, such that the arm portion 152 is stressed to separate from the solder material 182 and the MOV 112. This will cause the soldering strength of the thermal switch to decrease over time and the contact element is prone to separate from the MOV in nature or when subject to electromagnetic force generated due to electrical surge, causing failure of the device. If the thermal switch is disconnected while occurrence of electrical surge, a high voltage may generated and applied to the parallel equipments to be protected, causing risk of damage of the latter.

SUMMARY OF THE INVENTION

An object of the invention is to provide a surge suppression device with high structural stability which is only disconnected when the voltage sensitive element is failed due to aging or grid fault.

These and other objects and advantages of the invention are achieved by the solutions described herein after. It is noted that the objects or advantages are not necessarily achieved at the same time, but instead, can be achieved independently from each other.

In order to achieve one or more objects identified above, in one aspect, a surge suppression device is provided, which comprises a voltage sensitive element having a predetermined voltage rating, said voltage sensitive element increasing in temperature as voltage applied to the voltage sensitive element exceeds said voltage rating;

a first terminal having one end electrically connected to a first surface of said voltage sensitive element;

a second terminal comprising an arm portion and a contact portion, the contact portion being bent to the voltage sensitive element so as to be electrically connected to a second surface of the voltage sensitive element, and the second terminal being biased away from the voltage sensitive element; and a non-conductive barrier biased to move from a first position in which said non-conductive barrier allows electrical contact between the second terminal and the voltage sensitive element, to a second position in which the second terminal is not contacted to the voltage sensitive element and the non-conductive barrier is disposed between said second terminal and the voltage sensitive element, wherein the surge suppression device further comprises a blocking element and the second terminal further comprises an extension portion extended from the contact portion, and in the first position, a part of the blocking element is connected with the extension portion and another part of the blocking element is contacted to the non-conductive barrier.

In one embodiment, the another part of the blocking element has a notch for receiving at least a part of the non-conductive barrier, for example, the front edge of the barrier, such that the movement of the barrier is limited by the blocking element in such a way that it moves only in a direction parallel with, and not perpendicular to, the surface of the voltage sensitive element. Preferably, the notch is shaped such that the blocking element matches well with the front edge of the non-conductive barrier, in order to guide movement of the blocking element away from the voltage sensitive element through the sliding cooperation between the front edge of the barrier and the blocking element. However, it is understood by a skilled person in the art that, the notch may not exist, and/or the blocking element may have other part to limit the movement of the barrier.

In one embodiment, the extension portion is a plate extended from and substantially parallel with the contact portion and above said contact portion. Preferably, the plate is integral with the contact portion and contact with the contact portion through a linkage portion.

In another embodiment, the extension portion is a plate extended from and substantially perpendicular to the contact portion. Preferably, the plate is integral with the contact portion and located in a plane substantially perpendicular to a plane where the contact portion locates.

In a preferable embodiment, the plate has at least one surface provided with at least one bulge. The blocking element comprises a slot having a dimension equivalent to or smaller than that of the plate in order to receive the plate. The existence of the bulge facilitates the close engagement of the plate with the slot, so as to prevent the slip-off of the plate from the blocking element.

It is understood that the extension portion may also inclined with respect to a vertical plane at an angle between 0-90°. It is also understood that the shape, structure of the extension portion, and the way of engagement of the extension portion with the blocking element can be varied and the examples given herein are non-exhaustive. For example, in other embodiment where the extension portion is parallel with the contact portion, the extension portion may be provided with a hole and it is secured with the blocking element with a pin.

There is no particular requirement for the insulating materials as long as it is resistant to the temperature caused by the voltage sensitive element when subject to overvoltage. In one embodiment, the blocking element is made from insulating materials and resistant to a temperature between 140° C. and 200° C. or higher. For example, the blocking element is made from polytetrafluoroethylene (such as Teflon®).

In one embodiment, the blocking element is substantially rectangular in shape and its length is extended along the arm portion of the second terminal. It is expected that the shape of the blocking element is not limited to those described herein. For example the blocking element is cylindrical, square or in any other suitable shape, as long as the blocking element blocks the movement tendency of the barrier and separates the barrier from the contact portion in the first position.

In one embodiment, a conductive metal plate is disposed between the contact portion and the voltage sensitive element, the contact portion being electrically connected to the conductive metal plate through a first heat sensitive material, the conductive metal plate being electrically connected to the voltage sensitive element through a second heat sensitive material, and in the first position, the contact portion, the first heat sensitive material, the conductive metal plate, the second heat sensitive material and the voltage sensitive element are connected substantively in parallel with respect to each other.

In one embodiment, the conductive metal plate has a surface area not less than that of the contact portion. For example, the conductive metal plate has a surface area equal or larger than that of the contact portion. Preferably, the conductive metal plate occupies from about 10% to about 100%, or about 20% to about 100%, or about 30% to about 100%, or about 40% to about 100%, or about 50% to about 100%, or about 60% to about 100%, or about 70% to about 100%, or about 80% to about 100%, or about 90% to about 100%, preferably about 50% to about 90%, about 60% to about 90%, about 70% to about 90%, about 80% to about 90%, more preferably about 50% to about 80%, about 60% to about 80%, about 70% to about 80%, of the surface area of the second surface of the voltage sensitive element.

In one embodiment, the conductive metal plate is formed of copper or plated copper. The copper may be, for example, red copper or brass. The plated copper for example may be tin-plated or silver-plated red copper or brass.

In another embodiment, for example, the first heat sensitive material may be a low-temperature soldering material and the second heat sensitive material may be a high-temperature soldering material, and the first and/or the second heat sensitive materials are in conductive solid form and able to melt at a predetermined softening temperature. The first heat sensitive material has a softening temperature not higher than that of the second heat sensitive material. In one embodiment, the first heat sensitive material has a softening temperature less than that of the second sensitive material. In another embodiment, the first heat sensitive material has a softening temperature equal to that of the second sensitive material. Preferably, the first and/or second heat sensitive material is a solder metal comprised of a fusible alloy.

In embodiment of the invention, the voltage sensitive element is preferably a metal oxide varistor (MOV), for example, a MOV bare disc having a silver or copper outer layer.

In one embodiment, the non-conductive barrier is biased toward the second position by an elastic element. In one embodiment, the non-conductive barrier has a stopper element extending from a surface of the barrier, for holding the elastic element. Preferably, the stopper element has a guiding portion for receiving the elastic element. The elastic element is preferably a spring.

In one embodiment, the surge suppression device further comprises a seat on which the one end of the first terminal, the arm portion of the second terminal, the non-conductive barrier and the voltage sensitive element are mounted. In one embodiment, the seat comprises a pivot mount to which a pivot of the non-conductive barrier is mounted, such that the non-conductive barrier can rotate about the pivot.

The insulating blocking element of the present surge suppression device, independently from the second terminal, in one aspect holds the non-conductive barrier and in another aspect separates the barrier from the second terminal. When the contact portion is contacted to the voltage sensitive element, the non-conductive barrier applies a force to the blocking element toward the second position due to the elastic element, which force is parallel with the movement direction of the barrier, instead of the force in the direction perpendicular to the movement direction of the barrier as described in the prior art. Therefore, the barrier will not cause the contact portion to have an additional tendency to separate from the heat sensitive material. This improves the stability of the product structure and avoids unexpected failure due to long-term usage.

In another aspect, a surge suppression device is provided, which comprises a voltage sensitive element having a predetermined voltage rating, said voltage sensitive element increasing in temperature as voltage applied to the voltage sensitive element exceeds said voltage rating;

a first terminal having one end electrically connected to a first surface of said voltage sensitive element;

a second terminal comprising an arm portion and a contact portion, the contact portion being bent to the voltage sensitive element so as to be electrically connected to a second surface of the voltage sensitive element, and the second terminal being biased away from the voltage sensitive element; and a non-conductive barrier biased to move from a first position in which said non-conductive barrier allows electrical contact between the second terminal and the voltage sensitive element, to a second position in which the second terminal is not contacted to the voltage sensitive element and the non-conductive barrier is disposed between said second terminal and the voltage sensitive element, wherein the second terminal further comprises an extension portion extended from the contact portion, and the extension portion has a blocking portion, in the first position, the blocking portion is contacted to the non-conductive barrier and prevents the non-conductive barrier from moving toward the second position.

In one embodiment, the extension portion is a plate parallel with the contact portion and has at least a part above the contact portion.

In another embodiment, the blocking portion is integral with the extension portion and formed by cutting the extension portion. In another embodiment, the extension portion having at least a part above the contact portion is achieved through the blocking portion.

The present surge suppression device includes a blocking portion integral with the extension portion, instead of provision of an independent blocking element. The blocking portion is used to hold the non-conductive barrier and separate the non-conductive barrier from the second terminal. When the contact portion is contacted to the voltage sensitive element, the non-conductive barrier applies a force to the blocking portion toward the second position due to the elastic element, which force is parallel with the movement direction of the barrier, instead of the force in the direction perpendicular to the movement direction of the barrier as described in the prior art. Therefore, the barrier will not cause the contact portion to have an additional tendency to separate from the heat sensitive material. This improves the stability of the product structure and avoids unexpected failure due to long-term usage.

Similarly, it is understood that the extension portion may also inclined with respect to a vertical plane at an angle between 0-90°. It is also understood that the shape, structure of the blocking portion can be varied and the examples given herein are non-exhaustive.

Preferably, the contact portion of the second terminal, the first heat sensitive material, the conductive metal plate, and the voltage sensitive element are substantively connected in parallel with respect to each other, such that a laminated structure is formed. The laminated structure maximizes the contact areas between theses elements, such that the conductive metal plate disposed between the voltage sensitive element and the contact portion of the second terminal is able to absorb and transfer, to the greatest extent, the heat generated by the voltage sensitive element due to overvoltage applied thereon, to the first heat sensitive material, so that an improved sensitivity is achieved.

In addition, when the conductive metal plate has a surface area greater than that of the contact portion, for example, accounting for most of a MOV surface, the conductive metal plate will absorb most of the heat generated by the MOV and transfer the heat to the first heat sensitive material, such that it is more accurate to sense and respond to the heating of the MOV.

Typically, a silver layer having a thickness of between 30 and 50 μm is provided on a MOV surface. If the conductive metal plate is absent, the contact portion of the second terminal will be directly soldered to the silver layer. In this case, when large current occurs in the circuit, the heat generated will be concentrated on the portion of the silver layer where the contact portion locates. The silver layer therefore will be extremely prone to damage, causing damage to the MOV. When the conductive metal plate is present between the contact portion and the MOV silver layer and when large current occurs in the circuit, the conductive metal plate will disperse the stress generated by the large current and in the meantime distributed the heat as generated due to the large current across the metal plate, so as to avoid any heat concentration on a particular point or small area, so that the MOV is protected.

Finally, the pivot mount provided on the seat enables to non-conductive barrier to rotate about the pivot, such that the barrier moves from the first position to the second position without monolithic translation, but through a small-angle rotation. In this way, the time taken for the movement is reduced to achieve faster arc distinguishing.

BRIEF DESCRIPTION TO THE DRAWINGS

The invention will be described in various embodiments in reference to the accompanied drawings, in which the features shown are illustrative only and should not be interpreted as limiting to the scope of the present invention.

Figure 18:
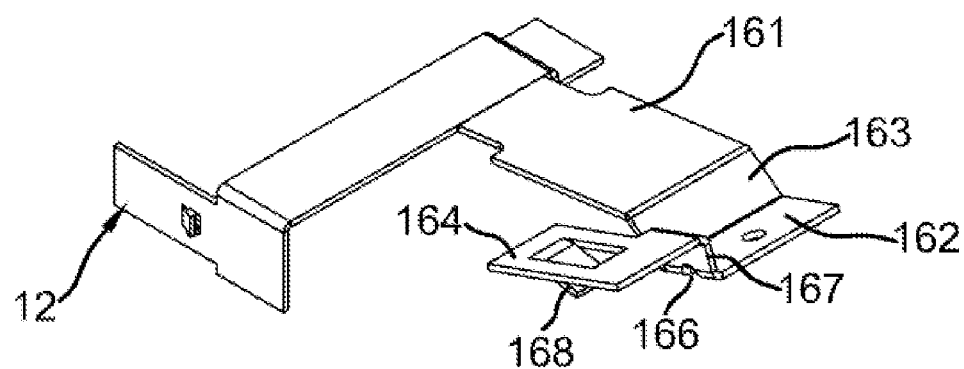
FIG. 18 shows a second terminal as used in yet another surge suppression device of the present invention.
Figure 19:
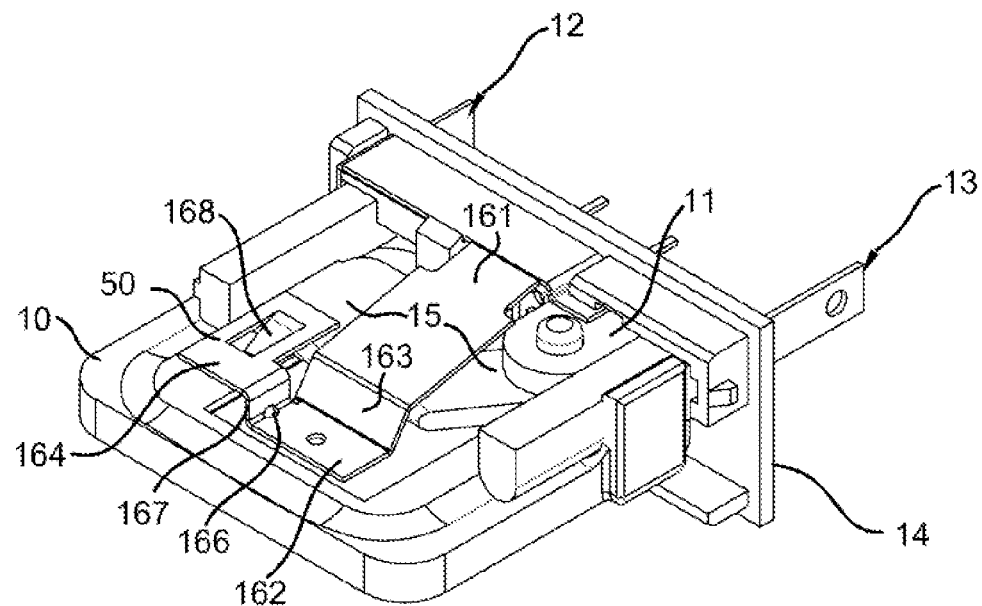

FIG. 19 a perspective view of a surge suppression device using the second terminal of FIG. 18 in effective state.

Figure 20:
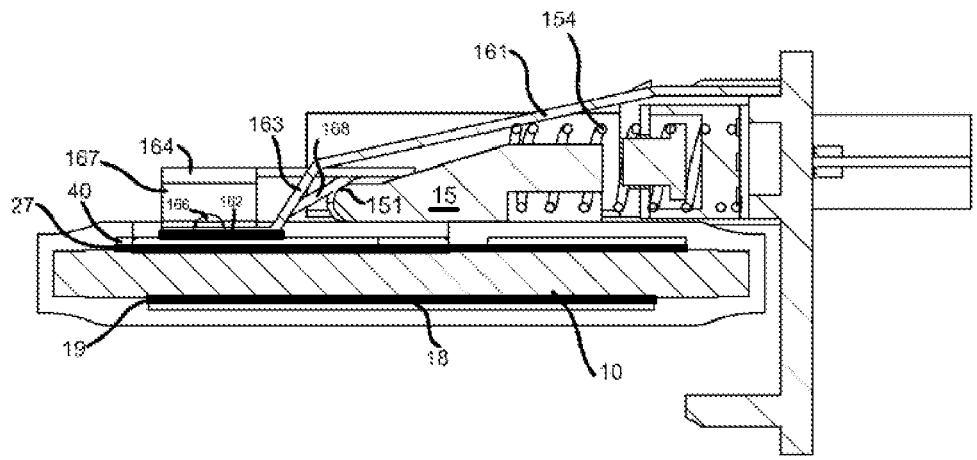

FIG. 20 is a side view of the surge suppression device of FIG. 18 in effective state.

Figure 21:
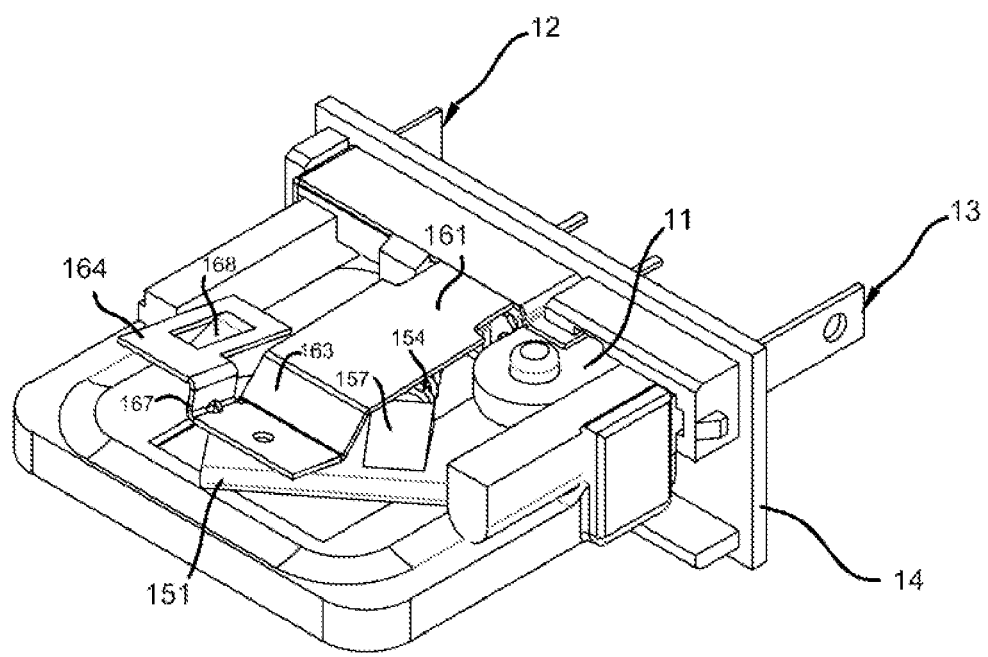

FIG. 21 is a perspective view of the surge suppression device of FIG. 18 in failed state.

Figure 22:
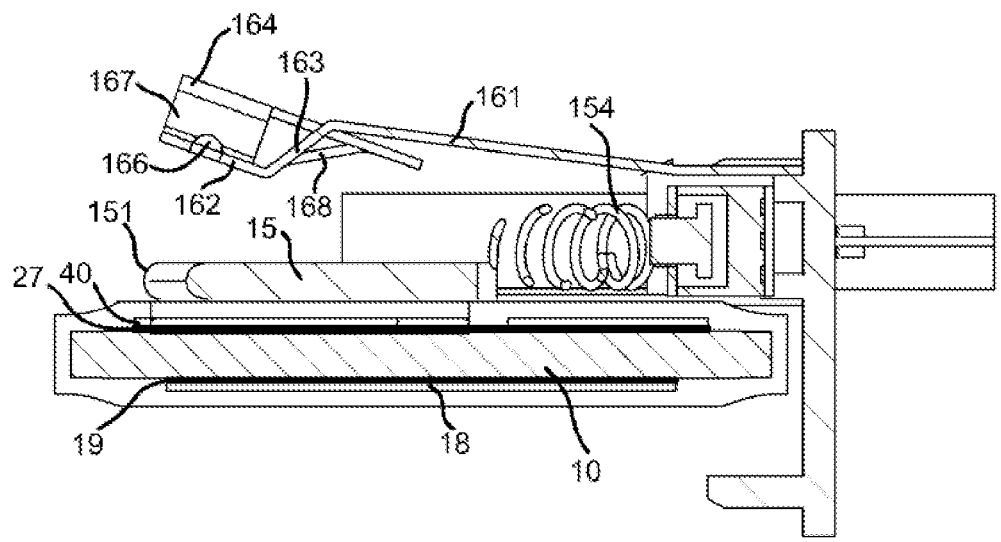

FIG. 22 is a side view of the surge suppression device of FIG. 21 in failed state.

Figure 23:
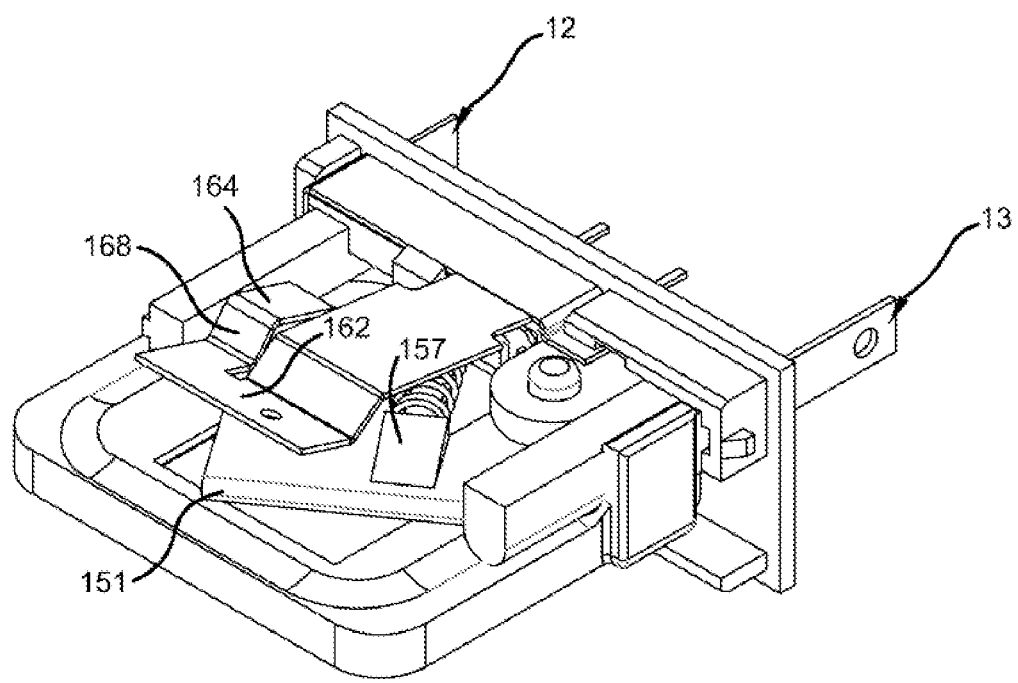

FIG. 23 is a perspective view of the surge suppression device in yet another example in failed state.

DETAILED DESCRIPTION OF THE INVENTION

The present invention will be described in conjugation with embodiments and drawings. It is understood that those embodiments are provided as examples, and one or more features from one of the embodiments may be combined with one or more features from another embodiment, to form a new embodiment comprising combinations of features from different embodiments. All of the embodiments are contemplated and within the scope of the present invention. Similarly, one feature of the invention as shown in one figure may be combined with another feature of the invention shown in another figure to constitute an embodiment comprising both of the features, which is also within the scope of the present invention.

Example 1

FIGS. 2 to 6 and FIGS. 8 to 11 show a first embodiment of the present invention.

Figure 1:
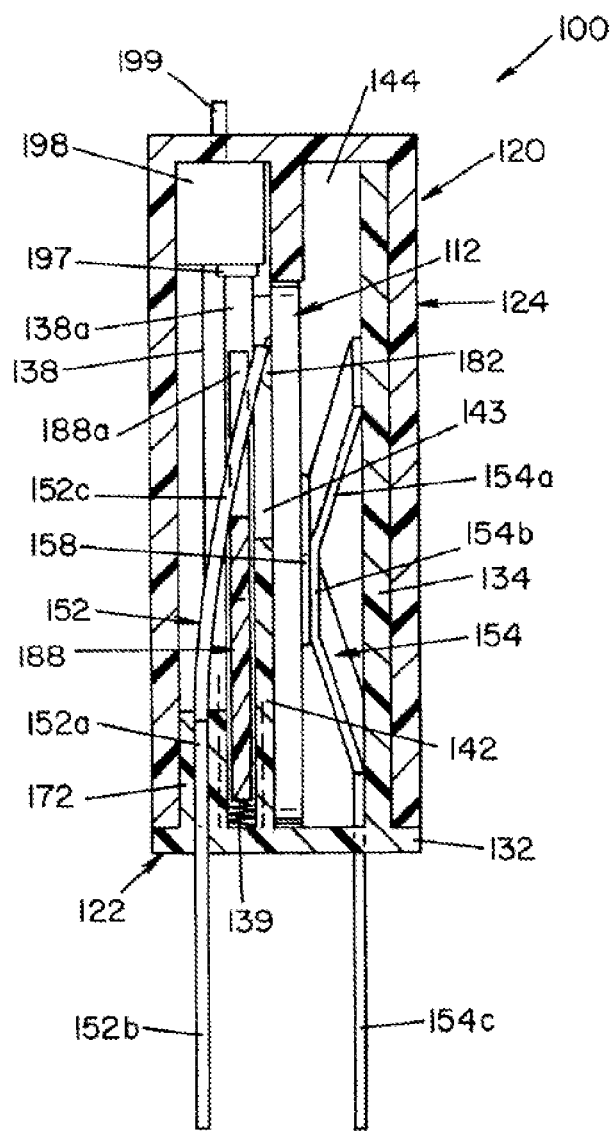
FIG. 1 is a sectional view of the surge suppression device as described in the prior art.
Figure 2:
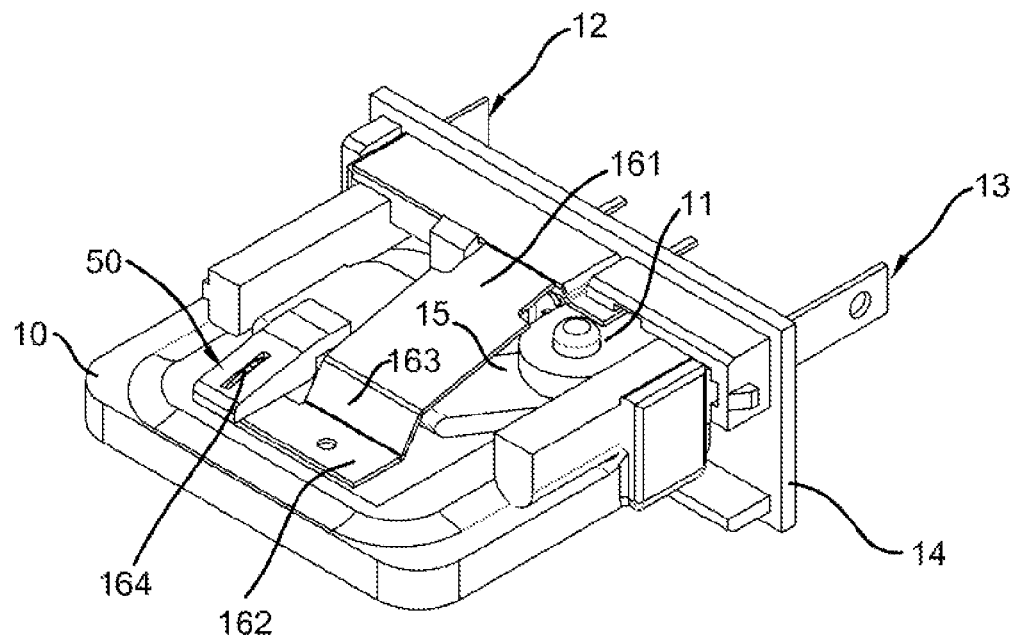
FIG. 2 shows a surge suppression device in effect according to one embodiment of the present invention.

FIG. 2 shows an exemplary surge suppression device in rectangular shape. Of course, it can be of any other practical shapes as appreciated by a skilled person in the art. A housing is omitted in order to show interior elements. The surge suppression device comprises a metal oxide varistor (MOV) 10 having a predetermined voltage rating. When a voltage higher the rating voltage is applied to the MOV, it will increase in temperature.

The surge suppression device further comprises a negative terminal 12 and a positive terminal 13. The terminal 12 has a contact portion 162 electrically connected to one surface of the MOV and an opposing end connectable to a ground or neutral line. The terminal 13 has one end 18 electrically connected, such as by soldering materials 19, to an opposing surface of the MOV and another end connectable to an electrical power line. The MOV can sense the voltage drop between the electrical power line and the ground or neutral line.

The terminal 12 further comprises an arm portion 161 and a bending portion 163 connecting the arm portion 161 and the contact portion 162. In other embodiments of the invention, the bending portion 163 may not exist, so that the arm portion 161 is directly connected to the contact portion 162. The existence of the bending portion 162 extends the spatial height between the arm portion 161 and the MOV, facilitating the accommodation of the non-conductive barrier 15 and its edge 151 (see below). The arm portion 161, bending portion 163 and the contact portion 162 normally form as a single piece, for example a metal plate, such that the contact portion 162 is biased away from the MOV by the intrinsic elasticity of the metal plate.

Figure 3:
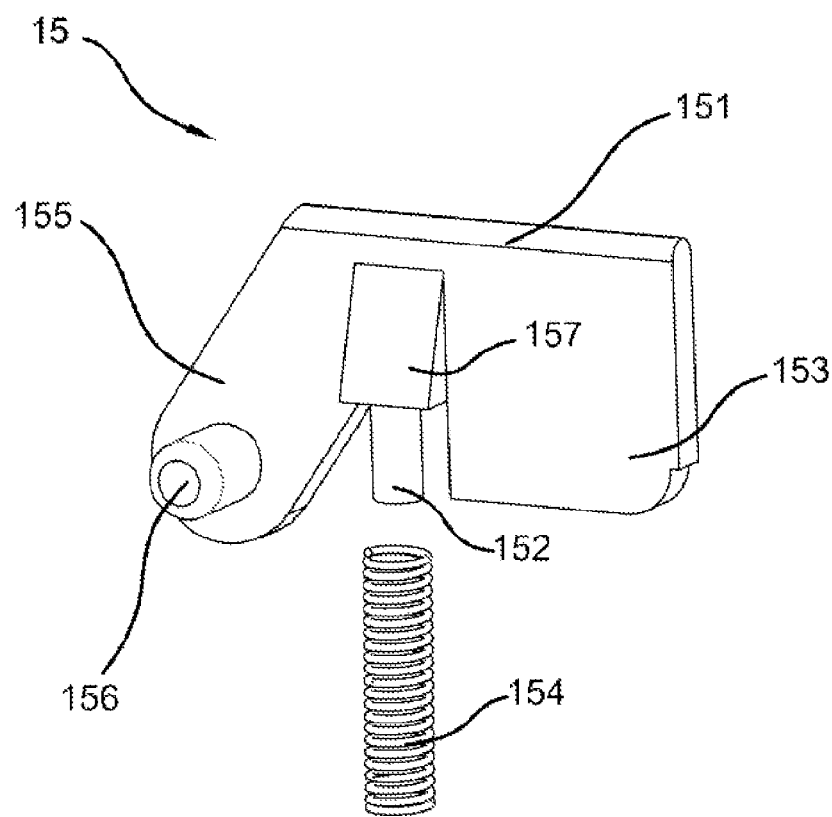
FIG. 3 shows details of the barrier of the surge suppression device as shown in FIG. 2.

As described above and shown in FIGS. 2 to 3, the surge suppression device comprises a non-conductive barrier 15. In this example, the non-conductive barrier 15 is generally a sheet and has a body 153 and an edge 151. The edge 151 has a smoothly transited surface and a thickness substantially same with that of the body 153. As shown in FIG. 3, the non-conductive barrier 15 may comprises a stopper element 157 extending from the body 153 and a spring 154. The spring 154 is received in the body 153, for example by an optional guiding portion 152, and obstructed by the stopper element 157. The non-conductive barrier 15 may also comprises an extension 155 and a pivot 156 disposed at a free end of the extension 155.

Figure 5:
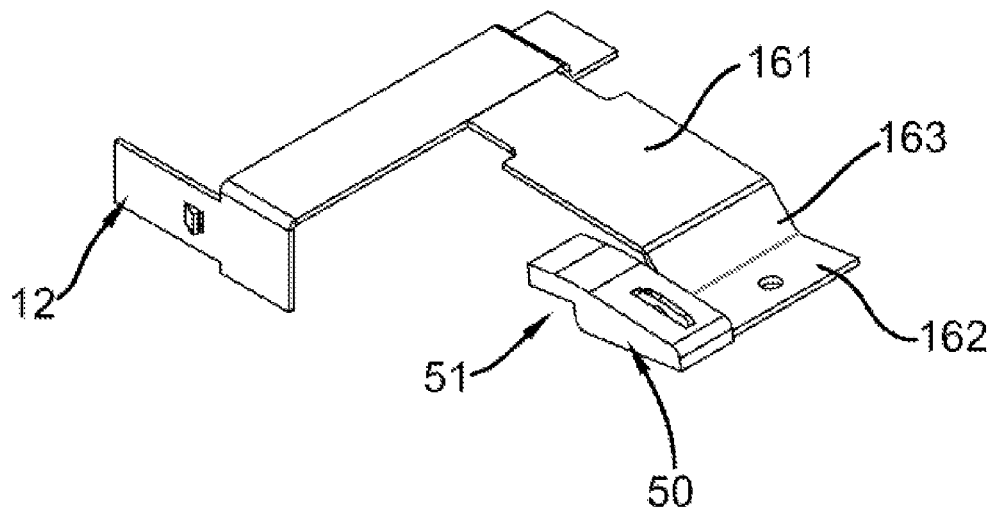
FIG. 5 shows an assembly of the second terminal and the blocking element used in the surge suppression device of FIG. 2.
Figure 6:
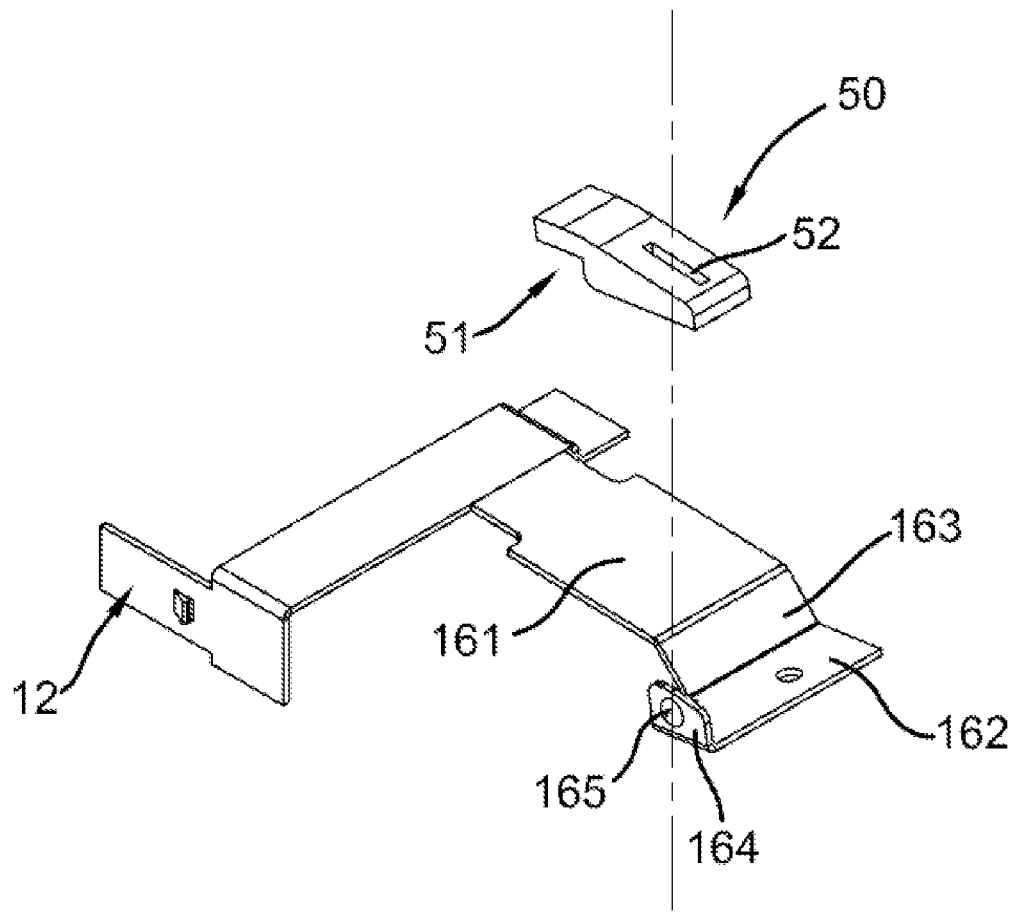
FIG. 6 shows details of the assembly as shown in FIG. 5.

In the embodiment, as shown in FIGS. 5 to 6, an extension portion 164 is laterally extended from the contact portion of the terminal 12 in the direction away from the MOV. The extension portion 164 is generally in the form of a plate and substantially perpendicular to the plane in which the contact portion 162 resides. A bulge 165 is formed on the surface of the plate 164.

As a key feature for the present embodiment, a separate blocking element 50 is provided to the surge suppression device. The blocking element 50 is generally made from electrically insulating material resistant to high temperature, for example, 140° C.-200° C. or higher so as to avoid softening or melt of the blocking element 50 when surrounding elements are heated. For example, the blocking element 50 is made from polytetrafluoroethylene (such as Teflon®).

The blocking element 50 has a part to contact with the extension portion 164 so as to connect therewith and another part to contact with the non-conductive barrier 15 so as to prevent the barrier 15 from movement toward the second position.

In the example, the blocking element 50 has a slot 52 for receiving the extension portion 164. The slot 52 has a substantially equivalent size as to the extension portion 164. When the extension portion 164 is inserted into the slot 52, the bulge 165 will be pressed against the inner wall of the slot 52, such that the extension portion 164 is securely connected with the blocking element 50. Of course, as will be appreciated by a skilled person in the art, the bulge 165 may not exist or be replaced by a feature with similar function. It will further be appreciated that in the event that the bulge 165 is absent, the size of the slot 52 may be slightly smaller than that of the extension portion 164 so as to achieve close engagement only through dimensional difference.

In this example, the slot 52 is penetrated through out the whole blocking element 50 and when the extension portion 164 is inserted, it will flush with the top surface of the blocking element without extrusion. In other embodiments, the slot 52 may not run through the whole blocking element 50.

In the example, a notch 51 is provided with the blocking element 50 for receiving a part of the barrier 15, such as the front edge 151.

Figure 7:
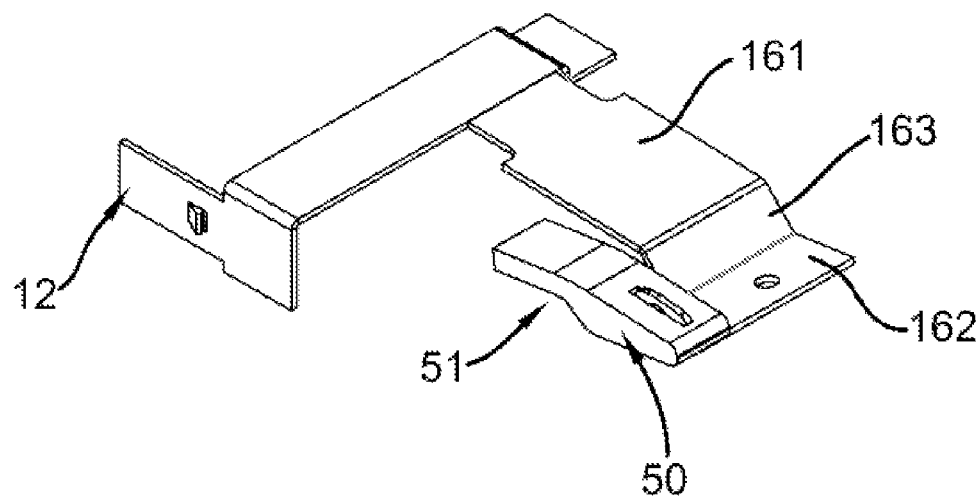
FIG. 7 shows another assembly of the second terminal and the blocking element used in an alternative surge suppression device of the present invention.

The notch 51 may have an angular inner surface, as shown in FIGS. 5 to 6, so as to hold the barrier 15 firmly or the notch 51 may have a smooth inner surface as shown in FIG. 7 such that during the movement of the barrier towards the second position, the movement of the blocking element 151 is guided away from the MOV through the sliding cooperation between the front edge 151 of the barrier 15 and the blocking element 50, and in turn, the contact portion 162 is also guided away from the MOV.

The blocking element 50 is generally in rectangular shape in this example and has a length extended along the arm portion 161 of the second terminal 12. It will be appreciated by a skilled person in the art that, the shape of the blocking element is not limited to those described and shown herein and can assume a shape such as a cylinder, a square, irregular shape or any other suitable shape, as long as it can, in the first position, prevent the barrier 15 from movement towards the second position and separate the barrier 15 from the contact portion 162.

As shown in FIG. 2, terminals 12, 13, MOV 10, the barrier 15 and other elements are mounted on a seat 14. As shown in FIG. 3, the seat 14 comprises a pivot mount 11 and a pivot hole 112. The pivot 156 of the extension 155 of the barrier 15 can be received in the pivot hole 112 such that the barrier 15 can rotate about the pivot.

Figure 4:
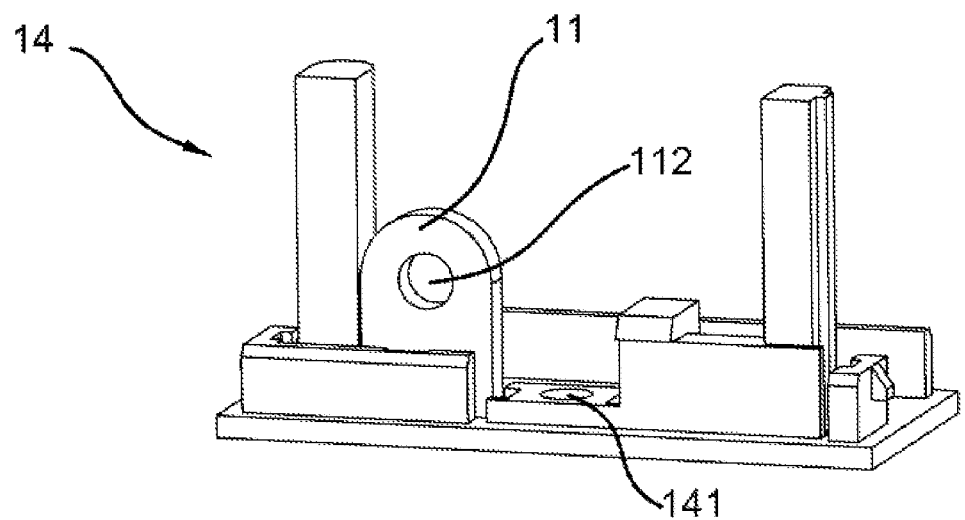
FIG. 4 shows details of the seat of the surge suppression device as shown in FIG. 2.

As shown in FIG. 4, the seat 14 may comprises an accommodation space 141 for accommodating the spring 154. In use, the spring 154 is located between the seat 14 and the stopper element 157 and in compressed state, such that the barrier 15 is biased away from the position as shown in FIG. 2.

FIGS. 3 and 4 only show an exemplary way for achieving the movement of the barrier 15. Other ways can be envisioned to achieve the biased movement of the barrier 15.

Figure 8:
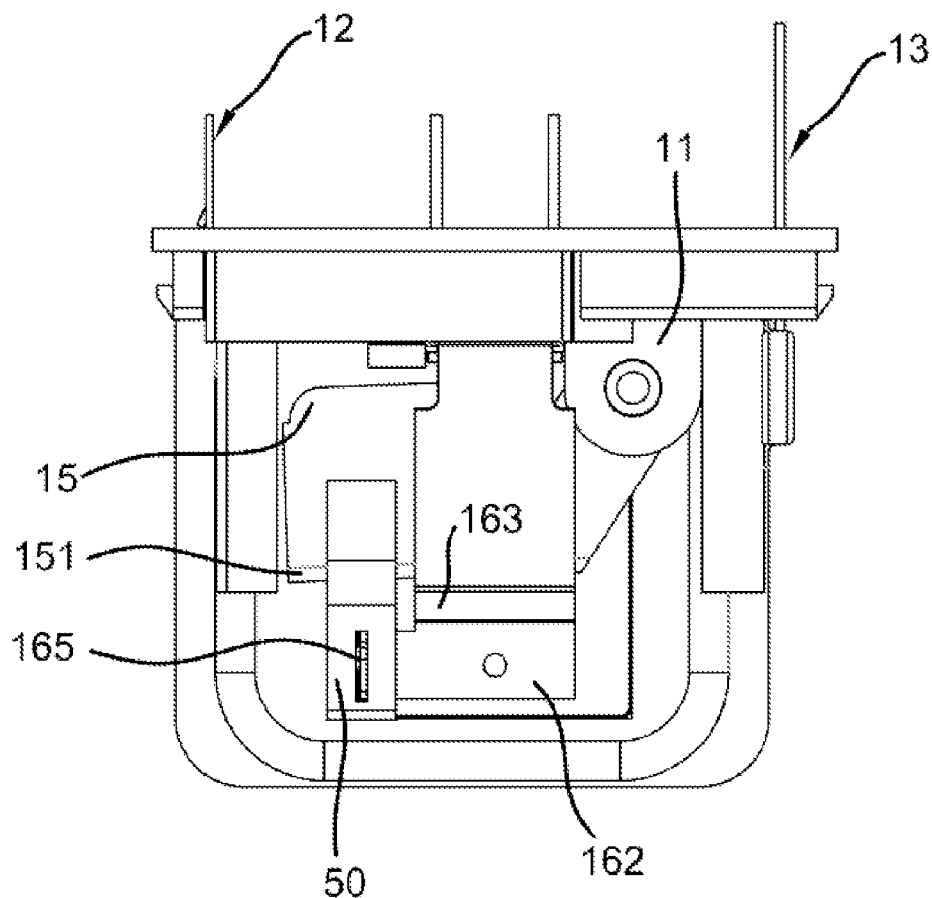
FIG. 8 is a top view of the surge suppression device of FIG. 2.
Figure 9:
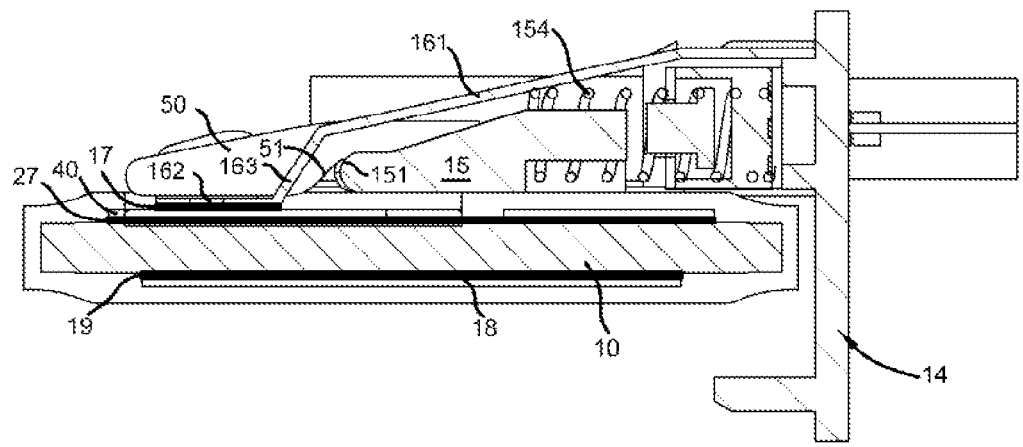
FIG. 9 is a sectional view of the surge suppression device of FIG. 2 in effective state.

FIG. 8 shows the top view of the surge suppression device as shown in FIG. 2 and FIG. 9 shows its sectional view. The contact portion 162 is connected to the MOV 10 through an electrically conductive metal plate (such as a red copper plate 40) and heat sensitive materials (such as soldering materials 17, 27). In this example, the contact portion 162 is connected to the red copper plate 40 through low-temperature soldering material 17, and the red copper plate 40 is then connected to the surface of the MOV 10 through high-temperature soldering material 27.

The low-temperature soldering material 17 is for example soldering material having a melting temperature of between 90° C. and 200° C. The high-temperature soldering material 27 is for example soldering material having a melting temperature above 200° C. The soldering materials 17, 27 are commercially available on the market. As a non-limiting example, the low-temperature soldering material 17 is a solid at room temperature (25° C.) and does not melt until up to about 90° C. Alternatively, the low-temperature soldering material 17 starts to melt or soften at a temperature ranging from about 70° C. to about 140° C., preferably from about 90° C. to about 200° C.

In other examples, for example, the heat sensitive materials can be formed by metal solder comprised of a fusible alloy, or an electrically conductive polymer. The person skilled in the art can readily select proper materials for use as the sensitive materials based on the disclosure of the present invention.

In this example, the MOV 10, the contact portion 162 of the terminal 12, and the red copper plate 40 have a joint angle of about 180° C., i.e., they are substantively connected in parallel such that they have the maximum contact area there between. The red copper plate 40 disposed between the MOV 10 and the contact portion 162 is able to transfer, to the greatest extent, the heat generated by the MOV 10 due to over-voltage applied thereon, to the low-temperature soldering material 17, to improve sensitivity.

As shown in FIG. 9, the red copper plate 40 has same area with that of the high-temperature soldering material 27 (area A), and the contact portion 162 has same area with that of the low-temperature soldering material (area B), and area A is significantly larger than area B. In another aspect, the area A is less than the surface area of the MOV 10 and accounts for about 70-80% of the surface area of the MOV 10.

The areas A and B may be varied. For example, the red copper plate 40 and the high-temperature soldering material 27 may have an area only slightly larger than that of the contact portion. Alternatively, the contact portion 162 may have an area larger or less than that of the low-temperature soldering material 17. Alternatively, the red copper plate 40 may have an area larger or less than that of the high-temperature soldering material 27.

As shown in FIG. 9, the blocking element 50 is attached to the contact portion 162 through the extension portion 164, and has another part, i.e., the notch 51, to abut against the front edge 151 of the barrier 15, such that, in the first position, the low-temperature soldering material 17 is a solid such that it can prevent the edge 151 from movement toward left direction in the figure. In other words, in the example shown in FIG. 9, the low-temperature soldering material 17 holds the barrier 15 such that the latter is not able to move and the barrier 15 does not have any other part contacting directly with any other part of the second terminal 12.

The blocking element 50 on one hand holds the non-conductive barrier 15, and on the other hand separates the barrier 15 from the second terminal 12, such that the barrier 15 does not contact with the second terminal 12 at any part. Due to the existence of the elastic element 154, the non-conductive barrier 15 applies a force onto the blocking element 50 in the direction towards the second position and parallel with the movement direction of the barrier 15, such that a tangential force is formed to the contact point of the contact portion 162 and the low-temperature soldering material 17. The tangential force is obviously different from the 'separation' force formed in the prior art. The soldering strength of the contact point will not be impaired by the tangential force over time and the stability of the product structure is improved and unexpected failure due to long-term usage can be avoided.

Figure 10:
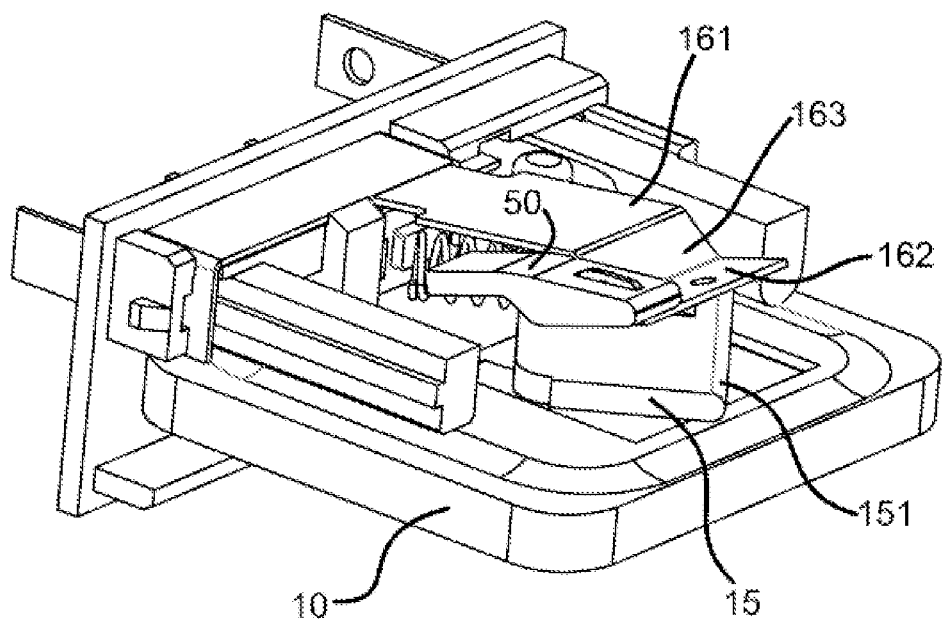
FIG. 10 is a perspective view of the surge suppression device of FIG. 2 in failed state.
Figure 11:
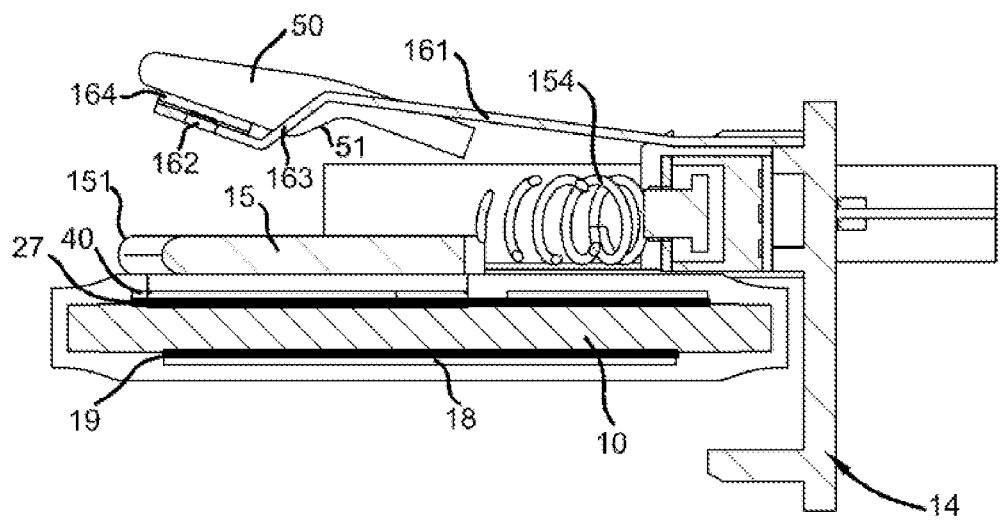
FIG. 11 shows a sectional view of the failed surge suppression device of FIG. 10.

FIG. 10 shows the surge suppression device of FIG. 2 in failed state. FIG. 11 is a sectional view showing the failed device. When the MOV is subject to voltage higher than the voltage rating thereof, it will increase in temperature, causing the heating of the low-temperature soldering material 17. When the temperature reaches the melting/softening temperature of the low-temperature soldering material, the soldering material will gradually become melted or softened, resulting in the separation of the contact portion 162 from the MOV, such that a gap is formed between the contact portion 162 and the MOV.

As shown in FIGS. 2, 8, and 9, in the present example, the barrier 15 is not contacted to the terminal 12 and the blocking element 50 prevents the barrier 15 from moving towards the second position. Under the effect of the spring 154, the barrier 15 is always abutted against the blocking element 50 (i.e., its notch 51). When the soldering material 17 starts to melt or soften, the strength of the soldering material 17 decreases, and the contact portion 162 is finally separated from the soldering material 17 under the elastic force of the second terminal 12 and moves upward and brings the blocking element 50 to move in the same direction. As shown in FIGS. 10 and 11, the upward movement of the blocking element 50 causes the revocation of the blocking to the barrier 15, and the front edge 151 of the barrier 15 moves to push the soldering material 17 under the force of the spring 154 and finally locates between the gap formed between the contact portion 162 and the MOV 10, so as to cut off any electric arc that is possibly formed in the gap.

As shown in FIGS. 10 and 11, during the movement toward the gap, the barrier 15 is rotated about the pivot 156 so that the edge 151 has a curved movement trajectory. The rotation about the pivot for a certain angle replaces the monolithic translation of the barrier, such that it takes less time for the non-conductive barrier to move into the gap and therefore faster arc distinguishing is achieved. The person skilled in the art will appreciated that, the combination of the extension 155, the pivot 156, the pivot mount 11 and the pivot hole 112 may independently be presented in another embodiment, to achieve faster arc distinguishing.

Example 2

FIGS. 12 to 17 show an alternative embodiment of the surge suppression device of the present invention. The surge suppression device of this example has similar structure as to Example 1, except that the extension portion 164 and the way it connects with the blocking element 50 are different.

Figure 12:
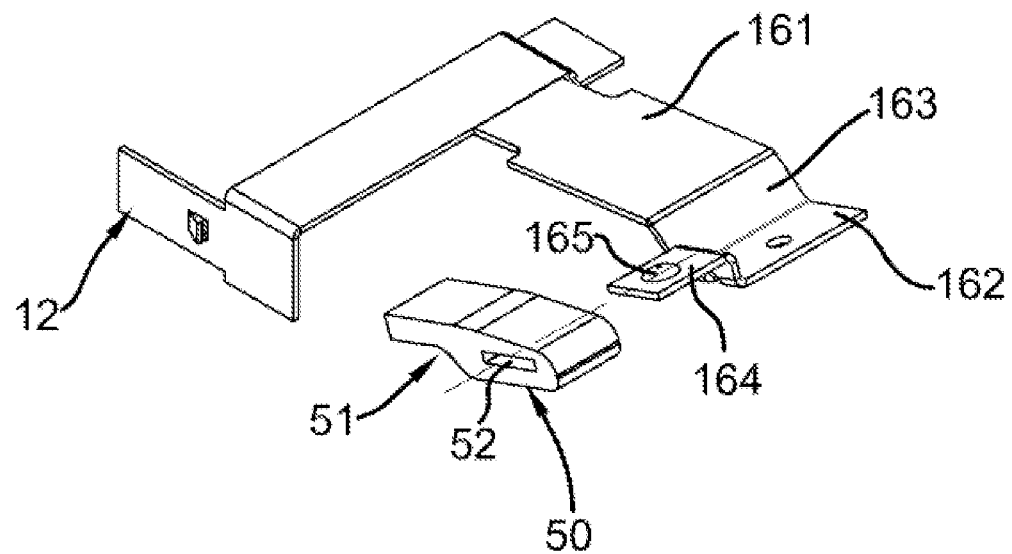
FIG. 12 shows a second terminal and a blocking element used in an alternative surge suppression device of the present invention.
Figure 13:
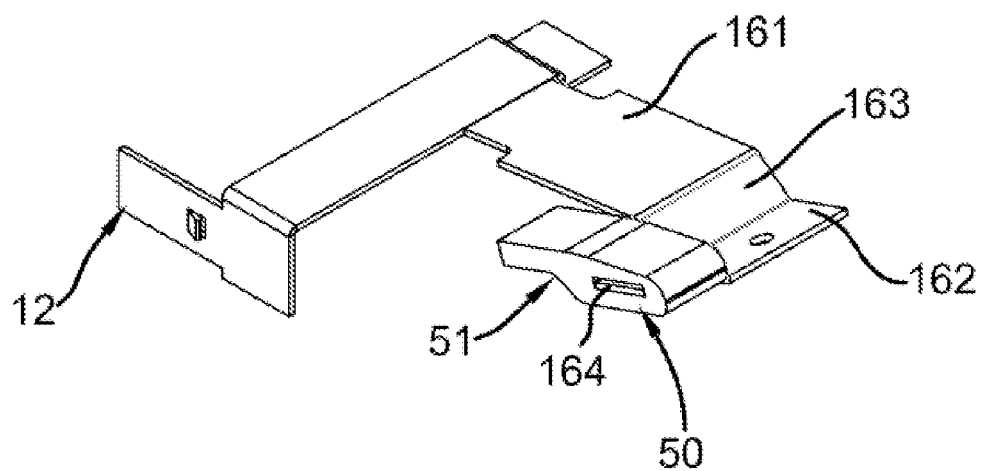
FIG. 13 shows an assembly of the second terminal and the blocking element as shown in FIG. 12.

In this example, as shown in FIG. 12, an extension portion 164 is extended laterally from the contact portion 162 of the terminal 12 in a direction parallel to the surface of the MOV. The extension portion 164 is generally in the form of a plate and runs parallel with the plane in which the contact portion 162 resides and is above said contact portion 162. In this example, the plate 164 is integral with the contact portion 162 and is linked to the contact portion 162 through a linkage portion 167, as shown in FIG. 14.

The existence of the linkage portion 167 is to place the extension portion 164 above the contact portion 162 such that the extension portion 164 is easily connected with the blocking element 50. Similarly, the blocking element 50 has a slot 52 for receiving the extension portion 164. A bulge 165 is provided on one surface of the plate 164 such that the plate 164 is closely attached to the slot 52 and not slipped-off.

In the example, a through hole 166 is provided at the joint of the contact portion 162 and the linkage portion 167 such that the low-temperature soldering material 17 can be loaded therein during manufacturing of the device. This will cause the contact area of the contact portion and the low-temperature soldering material 17 to increase and thus they are adhered securely. The through hole 169 at the center of the contact portion 162 has the similar effect. It will be appreciated that the through hole 166 does not necessarily exist.

Figure 14:
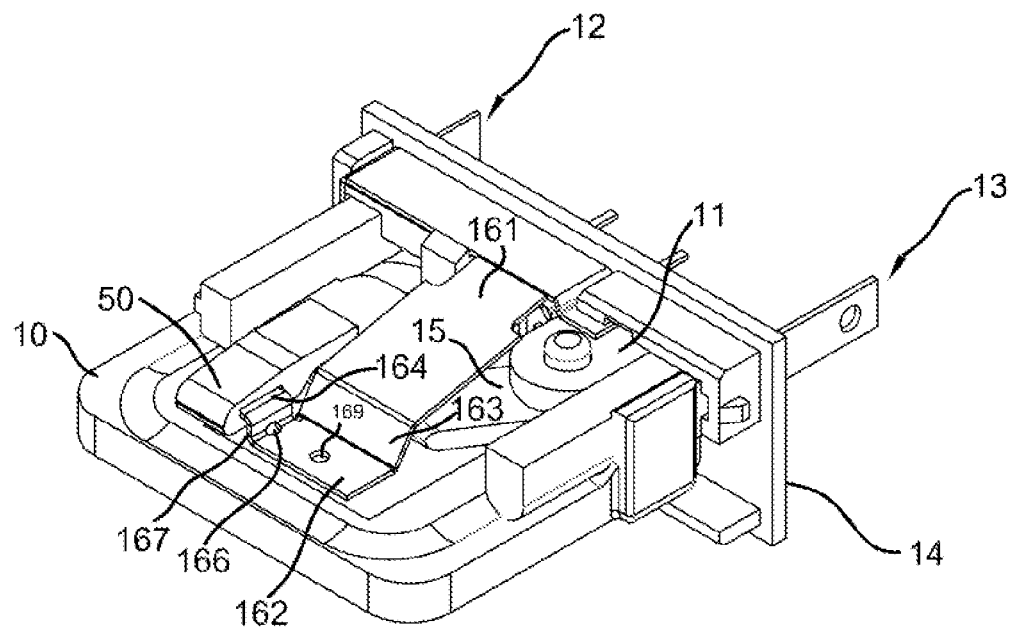
FIG. 14 is a perspective view of a surge suppression device using the second terminal and a blocking element of FIG. 12 in effective state.
Figure 15:
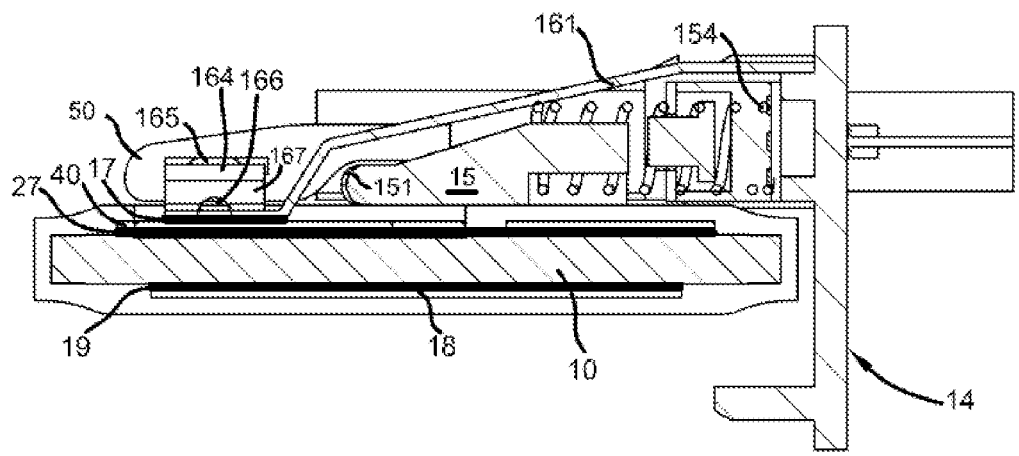
FIG. 15 is a side view of the surge suppression device of FIG. 14 in effective state.
Figure 16:
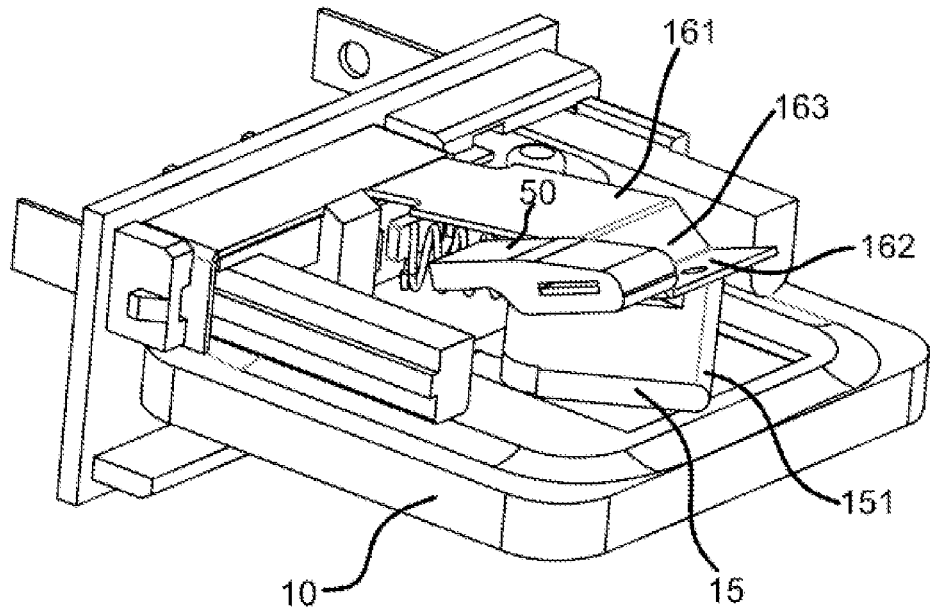
FIG. 16 is a perspective view of a surge suppression device using the second terminal and a blocking element of FIG. 12 in failed state.
Figure 17:
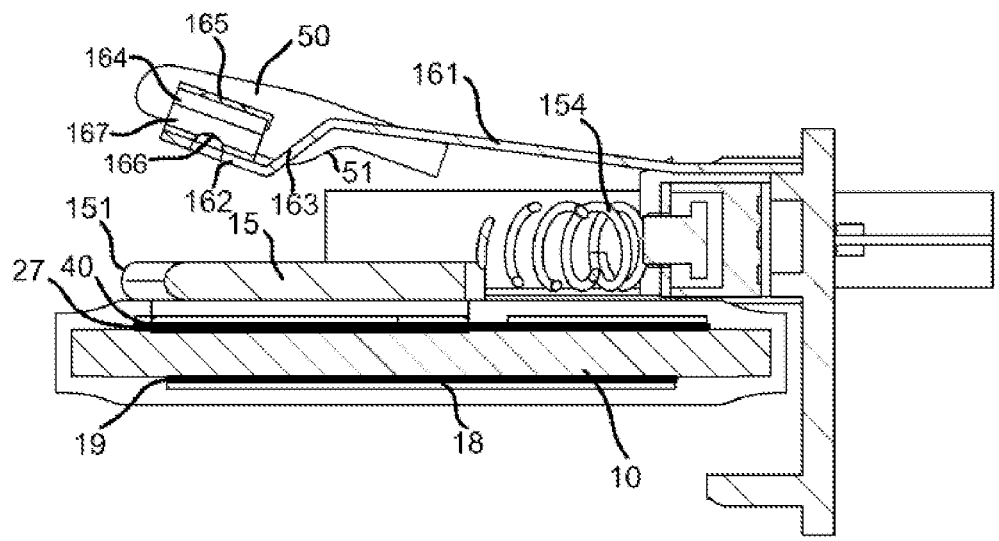
FIG. 17 is a side view of the surge suppression device of FIG. 15 in failed state.

As shown in FIGS. 14 and 15, in the present example, the barrier 15 is not contacted to the terminal 12 and the blocking element 50 prevents the barrier 15 from moving towards the second position. Under the effect of the spring 154, the barrier 15 is always abutted against the blocking element 50 (i.e., its notch 51). When the soldering material 17 starts to melt or soften, the strength of the soldering material 17 decreases, and the contact portion 162 is finally separated from the soldering material 17 under the elastic force of the second terminal 12 and moves upward and brings the blocking element 50 to move in the same direction. As shown in FIGS. 16 and 17, the upward movement of the blocking element 50 causes the revocation of the blocking to the barrier 15, and the front edge 151 of the barrier 15 moves to push the soldering material 17 under the force of the spring 154 and finally locates between the gap formed between the contact portion 162 and the MOV 10, so as to cut off any electric arc that is possibly formed in the gap.

Example 3

FIGS. 18 to 22 show another alternative embodiment of the surge suppression device of the present invention. The surge suppression device of this example has similar structure as to Example 2, except that the surge suppression device of this example does not include an independent blocking element. Instead, the function of the blocking element as described with respect to examples 1 and 2 is incorporated into the extension portion 164 such that the extension portion 164 has a blocking portion 168. In this example, the blocking portion 168 is in a form of a cantilever formed by cutting the extension portion 164 and is integral with the extension portion 164.

As shown in FIGS. 19 and 20, the blocking cantilever 168 prevents the barrier 15 from moving towards the second position. The barrier 15 is not contacted to the terminal 12. Under the effect of the spring 154, the barrier 15 is always abutted against the blocking cantilever 168. When the soldering material 17 starts to melt or soften, the strength of the soldering material 17 decreases, and the contact portion 162 is finally separated from the soldering material 17 under the elastic force of the second terminal 12 and moves upward and brings the blocking cantilever 168 to move in the same direction. As shown in FIGS. 21 and 22, the upward movement of the extension portion 164 causes the revocation of the blocking to the barrier 15, and the front edge 151 of the barrier 15 moves to push the soldering material 17 under the force of the spring 154 and finally locates between the gap formed between the contact portion 162 and the MOV 10, so as to cut off any electric arc that is possibly formed in the gap.

Example 4

FIG. 23 shows yet another embodiment of the surge suppression device of the present invention in failed state. In this example, the device has substantially same structure as to Example 3, except that the extension portion 164 being above the contact portion 162 is achieved by the blocking portion 168. The blocking cantilever 168 prevents the barrier 15 from moving towards the second position. The barrier 15 is not contacted to the terminal 12. Under the effect of the spring 154, the barrier 15 is always abutted against the blocking cantilever 168. When the soldering material 17 starts to melt or soften, the strength of the soldering material 17 decreases, and the contact portion 162 is finally separated from the soldering material 17 under the elastic force of the second terminal 12 and moves upward and brings the blocking cantilever 168 to move in the same direction. As shown in FIGS. 21 and 22, the upward movement of the extension portion 164 causes the revocation of the blocking to the barrier 15, and the front edge 151 of the barrier 15 moves to push the soldering material 17 under the force of the spring 154 and finally locates between the gap formed between the contact portion 162 and the MOV 10, so as to cut off any electric arc that is possibly formed in the gap.

It should be understood that various embodiments have been described with reference to the accompanying drawings in which only some example embodiments are shown. As described above, the feature or feature combinations in respective embodiment can independently appear or be used with a feature or feature combinations in other embodiments, as long as faster arc distinguishing or stronger structure stability is achieved.

The invention claimed is:

1. A surge suppression device with high structural stability, comprising
   a voltage sensitive element having a predetermined voltage rating, said voltage sensitive element increasing in temperature as voltage applied to the voltage sensitive element exceeds said voltage rating;
   a first terminal having one end electrically connected to a first surface of said voltage sensitive element;
   a second terminal comprising an arm portion and a contact portion, the contact portion being bent to the voltage sensitive element so as to be electrically connected to a second surface of the voltage sensitive element, and the second terminal being biased away from the voltage sensitive element; and
   a non-conductive barrier biased to move from a first position in which said non-conductive barrier allows electrical contact between the second terminal and the voltage sensitive element, to a second position in which the second terminal is not contacted to the voltage sensitive element and the non-conductive barrier is disposed between said second terminal and the voltage sensitive element, wherein
   said surge suppression device further comprises a blocking element and the second terminal further comprises an extension portion extended from the contact portion, and in the first position, a part of the blocking element is connected with the extension portion and another part of the blocking element is contacted to the non-conductive barrier, and wherein
   said another part of the blocking element has a notch for receiving at least a part of the non-conductive barrier.

2. The surge suppression device with high structural stability of claim 1, wherein the notch is shaped such that the blocking element matches well with the front edge of the non-conductive barrier.

3. The surge suppression device with high structural stability of claim 1, wherein the extension portion is a plate extended from and substantially parallel with the contact portion and above said contact portion, or the extension portion is a plate extended from and substantially perpendicular to the contact portion.

4. The surge suppression device with high structural stability of claim 3, wherein the plate has at least one surface provided with at least one bulge.

5. The surge suppression device with high structural stability of claim 3, wherein the blocking element comprises a slot having a dimension equivalent to or smaller than that of the plate.

6. The surge suppression device with high structural stability of claim 1, wherein the blocking element is made from insulating materials and resistant to a temperature between 140° C. and 200° C. or higher.

7. The surge suppression device with high structural stability of claim 6, wherein the blocking element is made of rigid materials.

8. The surge suppression device with high structural stability of claim 1, wherein the blocking element is substantially rectangular in shape and its length is extended along the arm portion of the second terminal.

9. The surge suppression device with high structural stability of claim 1, wherein a conductive metal plate is disposed between the contact portion and the voltage sensitive element, the contact portion being electrically connected to the conductive metal plate through a first heat sensitive material, the conductive metal plate being electrically connected to the voltage sensitive element through a second heat sensitive material, and in the first position, the contact portion, the first heat sensitive material, the conductive metal plate, the second heat sensitive material and the voltage sensitive element are connected substantively in parallel with respect to each other.

10. The surge suppression device with high structural stability of claim 9, wherein the conductive metal plate has a surface area not less than that of the contact portion.

11. The surge suppression device with high structural stability of claim 9, wherein the conductive metal plate is a red copper plate or a tin-plated or silver-plated red copper plate.

12. The surge suppression device with high structural stability of claim 9, wherein the first heat sensitive material has a softening temperature not higher than that of the second heat sensitive material.

13. The surge suppression device with high structural stability of claim 1, wherein the non-conductive barrier has a front edge with a smoothly transited surface.

14. The surge suppression device with high structural stability of claim 1, wherein the voltage sensitive element is a metal oxide varistor (MOV) bare disc having a silver or copper outer layer.

15. The surge suppression device with high structural stability of claim 9, wherein the first and/or second heat sensitive material is a solder metal comprised of a fusible alloy.

16. The surge suppression device with high structural stability of claim 1, wherein the non-conductive barrier is biased toward the second position by an elastic element.

17. The surge suppression device with high structural stability of claim 16, wherein the non-conductive barrier has a stopper element extending from a surface of the barrier, for holding the elastic element.

18. The surge suppression device with high structural stability of claim 17, wherein the stopper element has a guiding portion for receiving the elastic element.

19. The surge suppression device with high structural stability of claim 16, wherein the elastic element is a spring.

20. The surge suppression device with high structural stability of claim 1, wherein the surge suppression device further comprises a seat having a pivot mount to which a pivot of the non-conductive barrier is mounted, such that the non-conductive barrier can rotate about the pivot.

* * * * *